United States Patent [19]
Allen et al.

[11] Patent Number: 5,408,869
[45] Date of Patent: Apr. 25, 1995

[54] GAUGE FOR CHARACTERIZING ROLLER SURFACE VENTING

[75] Inventors: Timothy D. Allen, Hilton; Edward R. Schickler, Webster; T. Tajuddin, Rochester, all of N.Y.

[73] Assignee: Eastman Kodak Company, Rochester, N.Y.

[21] Appl. No.: 166,435

[22] Filed: Dec. 14, 1993

[51] Int. Cl.6 ............................ G01N 7/00; G01B 5/28
[52] U.S. Cl. ........................................... 73/105; 73/37
[58] Field of Search .................. 73/37, 37.5, 38, 105, 73/104

[56] References Cited

U.S. PATENT DOCUMENTS

| | | | |
|---|---|---|---|
| 2,417,988 | 3/1947 | Mooney | 73/105 |
| 2,713,789 | 7/1955 | Kelton | 73/38 |
| 2,963,900 | 12/1960 | Kuebler | 73/105 |
| 3,371,518 | 3/1968 | Keyes | 73/38 |
| 3,863,492 | 2/1975 | Trask, II | 73/37.5 |
| 4,019,379 | 4/1977 | Wartelle et al. | 73/105 |
| 4,127,025 | 11/1978 | Mills et al. | 73/38 |
| 4,345,457 | 8/1982 | Kuroki et al. | 73/37.5 |
| 4,355,535 | 10/1982 | Vaughan | 73/37.8 |
| 4,363,235 | 12/1982 | Vulliens et al. | 73/38 |
| 4,571,985 | 2/1986 | Daly | 73/38 |
| 4,656,866 | 4/1987 | Aarts | 73/49.3 |
| 4,676,091 | 6/1987 | Schuster et al. | 73/38 |
| 4,724,591 | 2/1988 | Zohler | 29/157.3 |
| 4,914,810 | 4/1990 | Zohler | 73/38 |

OTHER PUBLICATIONS

V. Radhakrishnan & V. Sagar "Surface Roughness Assessment By Means of Pneumatic Measurement", 1970, pp. 1–8, Fourth all India Machine Tool Design and Research Conference.

*Primary Examiner*—Hezron E. Williams
*Assistant Examiner*—Michael J. Brock
*Attorney, Agent, or Firm*—Carl F. Ruoff

[57] ABSTRACT

The present invention is a gauge and method for characterizing the surface venting of rollers. The gauge includes a smooth pliable saddle with a pick-up head positioned at a mid-point of the saddle. The pick-up head includes an opening which faces the outer surface of a roller when the saddle is draped over the roller. The roller's venting characteristics are determined by applying a vacuum to the pick-up head and measuring the equilibrium flow rate between the saddle and the outer surface of the roller.

14 Claims, 3 Drawing Sheets

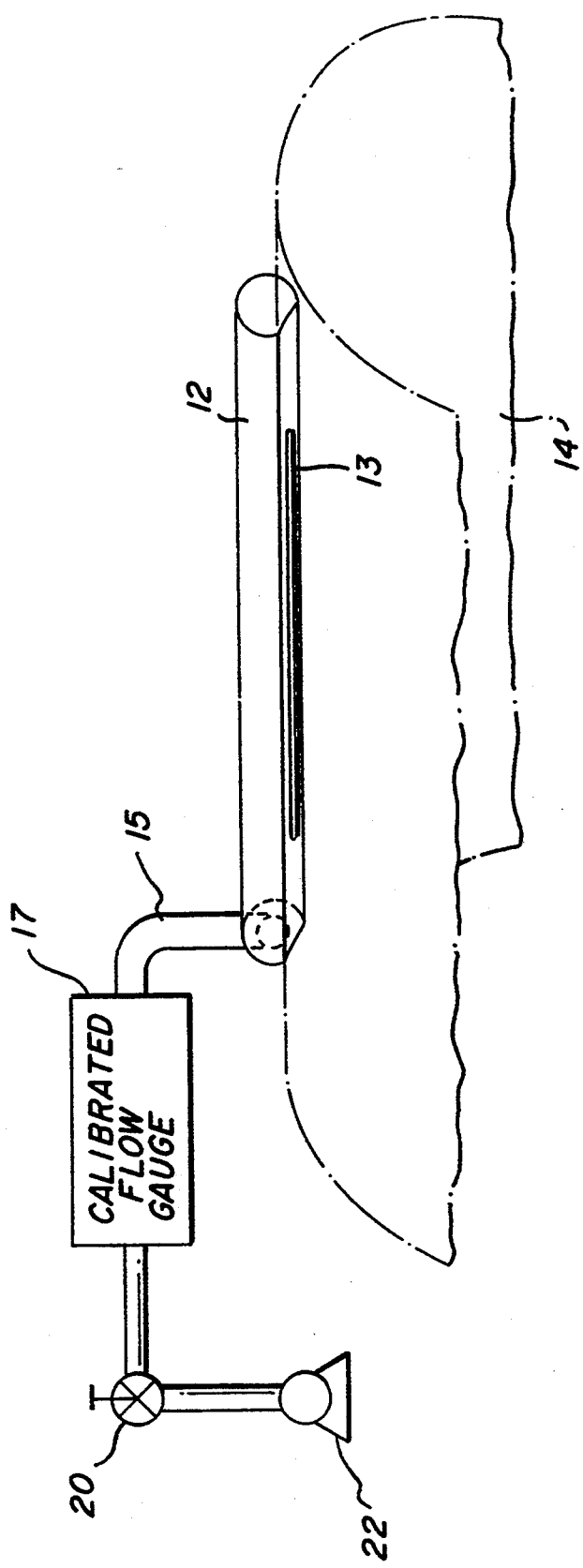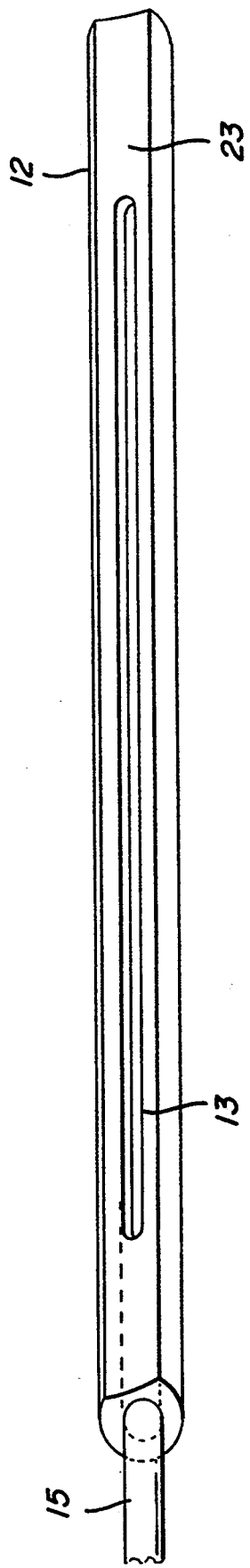
FIG. 2
FIG. 3

GAUGE FOR CHARACTERIZING ROLLER SURFACE VENTING

FIELD OF THE INVENTION

The present invention relates to a device for characterizing surface venting of rollers. More particularly, the present invention can be used to characterize the web-to-surface venting of a roller during the manufacture of the roller surface.

BACKGROUND OF THE INVENTION

Textured surfaces are used on web conveyance machine rollers to relieve the air that is entrained between the roller and the moving web. This allows the webs to be run at higher speeds while maintaining traction between the web and the roller surface. In the present invention a textured surface is defined as a surface which is three dimensional and includes interconnected plateaus or craters. Textured surfaces can also include rounded peaks and valleys.

The conventional measurement method to determine the texture of a surface is to run a stylus across the outer surface at some position on the circumference. From this measurement a numerically estimated standard roughness parameter is determined. This parameter can be expressed as average roughness, RMS or 10 point, and from this measurement a characterization of the resulting traction is inferred. The main drawback of the stylus method is that the roughness values measured are representative of a small section taken from the tracing stylus and not of the whole surface. In addition, none of the estimated parameters provides true characteristics of the surface venting. Since surface venting is the most reliable way to determine the traction of the roller, the prior art off-line methods do not properly measure the roller characteristics. Even advanced optical measurement systems, which can show three dimensional irregularities, have the limitation of not being able to characterize the surface venting.

Dynamic traction testing is one on-line method used to characterize surface venting of the surface of the roller. The other known on-line method is by measuring the air film thickness between two moving surfaces under various operating conditions. Both these methods require a web conveyance machine for the test to be conducted.

These limitations of the prior art have resulted in difficulties in producing surfaces with consistent and repeatable traction and venting characteristics. This problem is illustrated in FIG. 1 which shows results of surface venting characteristics of several rollers. All of the rollers met the specifications of the standard roughness parameter using the stylus method. The surface venting was then characterized through dynamic traction testing. It can be seen that although the rollers were manufactured to meet the same specifications, the surface venting varied significantly from roller to roller.

Thus, there is a need to develop a device which can accurately characterize the surface venting of the roller and, therefore, the roller's traction without requiring a web conveyance machine to run a cumbersome test. The present invention describes a method and apparatus which allows one to accurately characterize the surface venting and traction of a textured roller surface without the use of web conveyance machinery.

SUMMARY OF THE INVENTION

The present invention is an apparatus and method for characterizing the surface venting of a roller having a cylindrical surface. The apparatus includes a smooth pliable saddle capable of being draped over the cylindrical surface. A pick-up head is included which has an opening positioned at the mid-point of the saddle. The pick-up head and opening face the cylindrical surface when the saddle is draped over the cylindrical surface. A vacuum is applied to the pick-up head for sucking air between the cylindrical surface and the saddle and through the opening when the saddle is draped over the cylindrical surface. From this the surface venting of the roller is characterized.

The present invention can also be used to measure the wear on the outer surface of a roller and to determine whether a roller will have proper traction for conveying a web.

BRIEF DESCRIPTION OF THE DRAWINGS

FIG. 2 is a sketch of the apparatus of the present invention.

FIG. 3 shows a detailed view of the pick-up head of the present invention.

Figure 1:
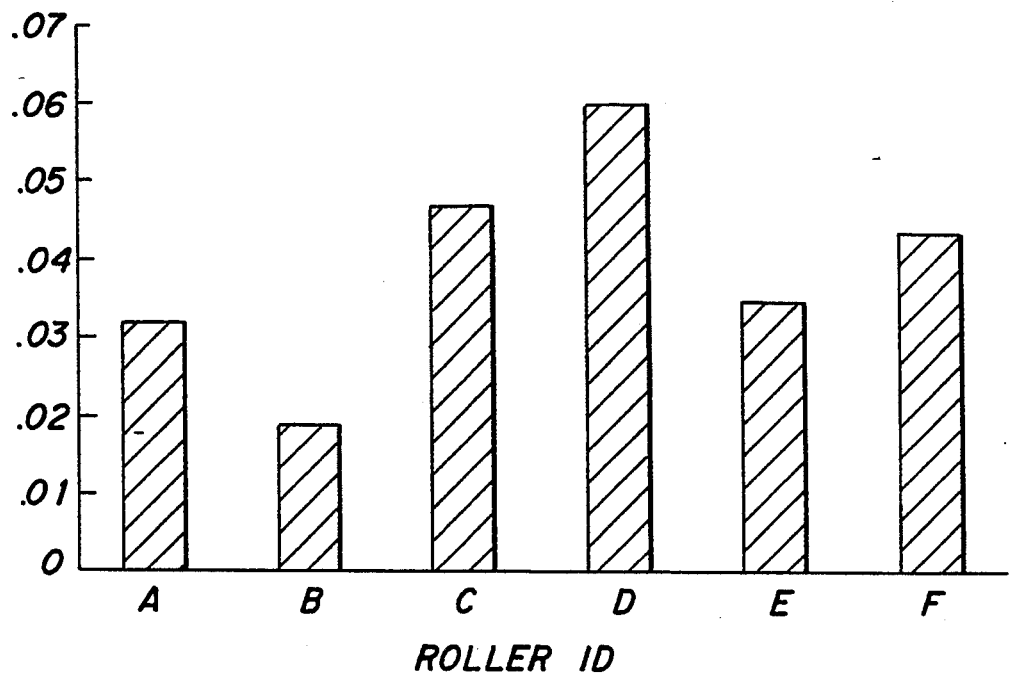
FIG. 1 shows the variation in surface venting of rollers manufactured with stylus specification and a comparison using the gauge of the present invention to determine the surface venting.

For a better understanding of the present invention together with other objects, advantages and capabilities thereof, reference is made to the following detailed description and appended claims in connection with the above described drawings.

DETAILED DESCRIPTION OF THE PREFERRED EMBODIMENTS

FIG. 2 shows the vent gauge of the present invention. It includes a pick-up head 12 with an opening 13, preferably an elongate slot, mounted at the middle of a saddle 14 which is made of a smooth flexible material. Preferably, the saddle 14 is made from a film such as polyethylene terepthalate. The saddle 14 includes an opening which matches the size of the pick-up head 12. The pick-up head is attached to the saddle with some type of flexible cement, preferably silicon rubber cement. The pick-up head 12 which can be made of Plexiglas has one end closed and a tube 15 attached to the other end. The tube 15 is connected to a vacuum pump 22 through a calibrated flow gauge 17 and pressure control valve 20. When the saddle 14 is placed over the surface of a roller, the flow from between the roller and the saddle 14 through the opening 13 is measured. This allows one to determine the venting characteristics of the roller.

The pick-up head 12 is shown in more detail in FIG. 3. The pick-up head 12 includes a surface 23 which is preferably curved to match the surface of the roller to be measured. A slot 13 preferably 6 to 7 inches long and ⅛ inch in width is provided on the curved surface. The pick-up head 12 is closed at one end and attached to a tube connected to a flow gauge and a vacuum pump at the other end. The flow gauge used was an MXS 0258C-00500SB (500 cc/min). The present invention can be used to determine the venting of randomized surfaces such as shot blasted surfaces and it can also be used to measure the venting of regularly patterned surfaces such as micro grooved surfaces.

Figure 4:
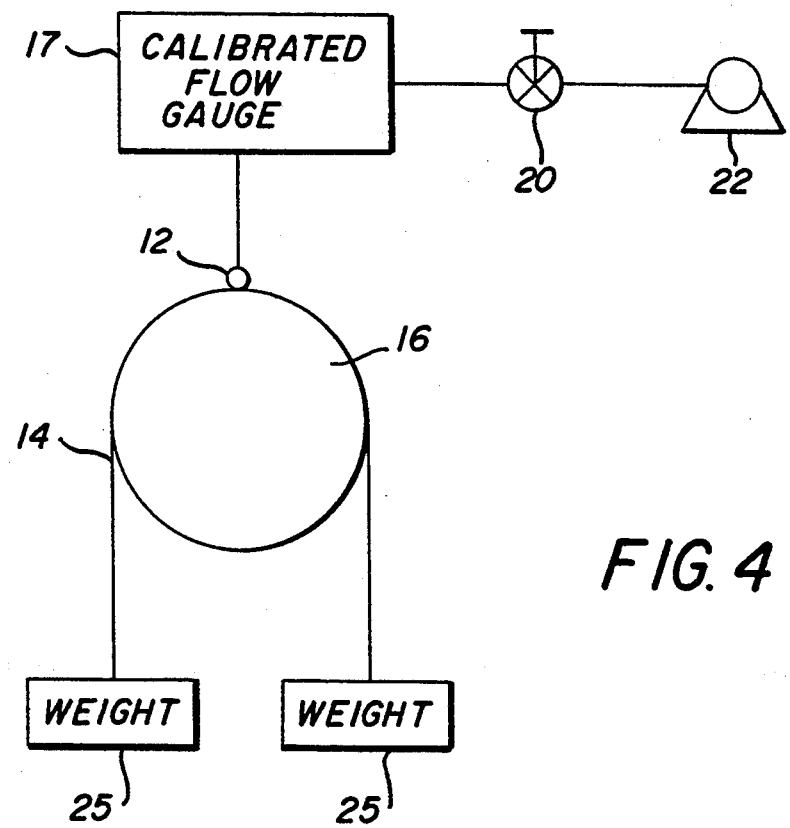
FIG. 4 is a schematic of the present invention.

The measurement method comprises carefully placing the saddle 14 on a test roller 16 having known venting characteristics and applying tension by hanging weights 25 on both ends of the saddle 14. This is shown schematically in FIG. 4. A vacuum is applied through pump 22 and an equilibrium flow rate is measured. The vacuum level is set by the pressure control valve 20. This procedure is repeated for a number of test rollers, and a range of acceptable flow rates at a predetermined vacuum and tension is determined. Then, using the same weights and vacuum level the saddle 14 is draped over the surface of a roller to be tested. The flow rate is measured and it is determined whether the equilibrium flow rate is within an acceptable range. If the roller being tested has a flow rate within the acceptable range, the roller can be used to carry the web. If the roller venting characteristics fall outside the proper range, the roller surface must be altered.

Example

Figure 5:
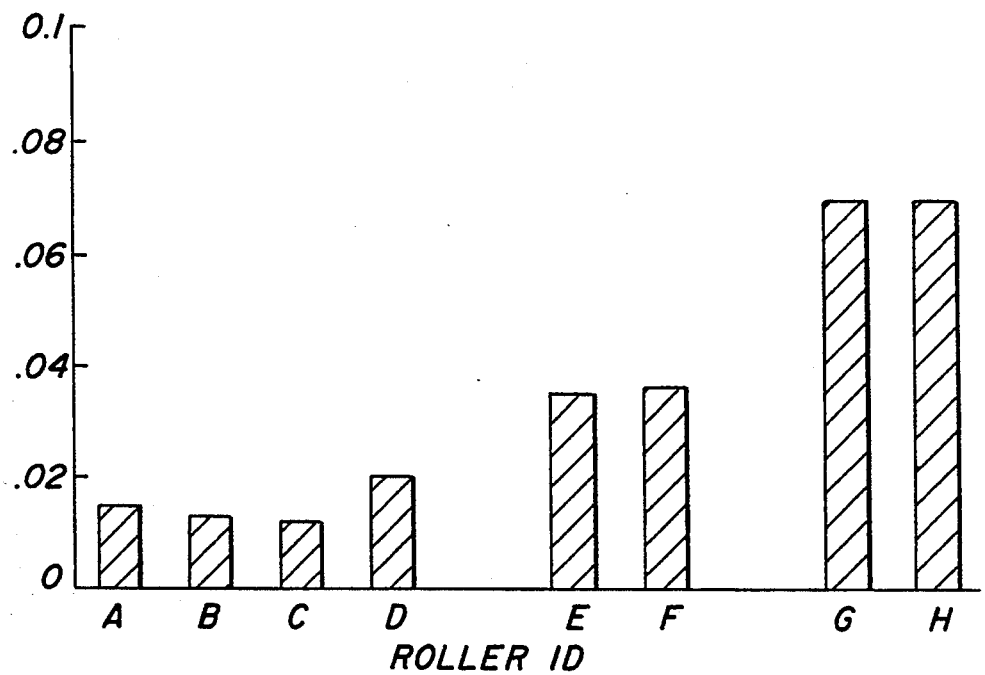
FIG. 5 shows the venting of rollers using an on-line traction test.
Figure 6:
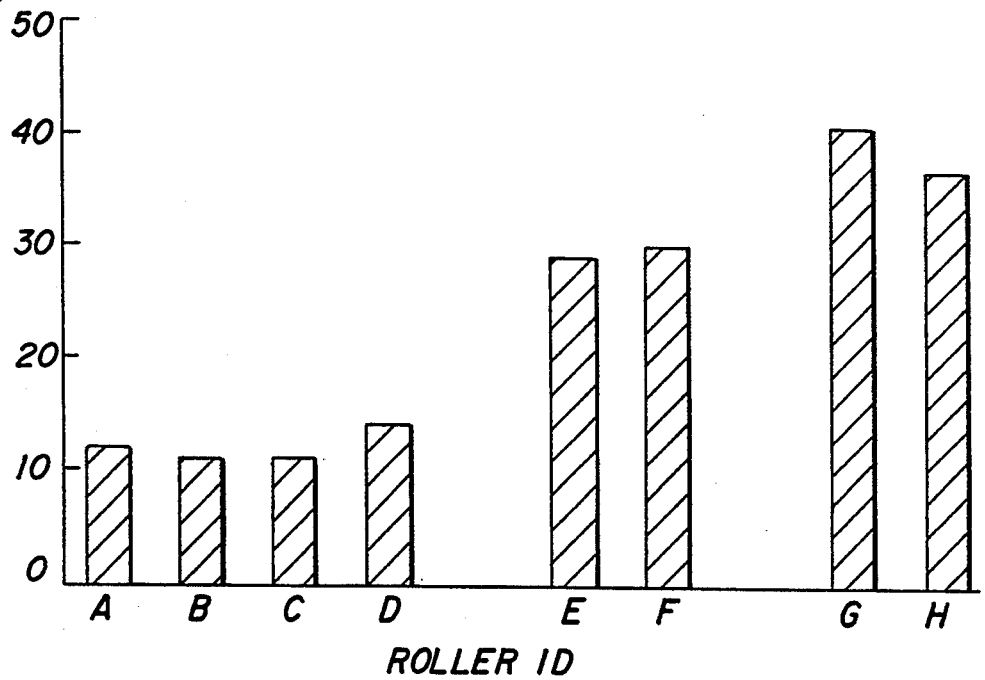
FIG. 6 shows the venting of rollers using the test method and apparatus of the present invention.

The present invention was used to characterize the venting of eight textured rollers. FIG. 5 shows the results of traction tests on the eight rollers. The eight rollers were then tested using the vent gauge apparatus and method of the present invention and the results are shown in FIG. 6. As can be seen from comparing FIGS. 5 and 6, there is excellent correlation between the vent gauge method and the dynamic traction method. The rollers tested were not the same as those shown in FIG. 1. In addition, roller surfaces that are finished to meet vent gauge specifications show consistent traction performance. Thus, the present invention provides a reliable, inexpensive, off-line test method and apparatus for characterizing the surface venting of rollers.

Although the present invention has been used to characterize rollers, it is also useful for measuring the venting characteristics of any cylindrical surface, such as toner rollers, printing wheels or casting drums.

While there has been shown and described what are presently considered the preferred embodiments of the invention, it will be obvious to those skilled in the art that various changes and modifications may be made therein without departing from the scope of the invention as defined by the appended claims.

What is claimed is:

1. An apparatus for measuring the surface venting of a cylindrical surface comprising:
   a smooth pliable saddle capable of being draped over the cylindrical surface;
   a pick-up head having an opening positioned at a midpoint of said saddle, the opening facing the cylindrical surface when said saddle is draped over the cylindrical surface; and
   a vacuum pump coupled to said pick-up head for sucking air between the cylindrical surface and said saddle and through the opening when said saddle is draped over the cylindrical surface.

2. The apparatus according to claim 1 wherein said saddle comprises polyethylene terepthalate.

3. The apparatus according to claim 1 further comprising:
   a flow gauge for measuring the air sucked through the opening.

4. The apparatus according to claim 1 further comprising:
   weights attached to the saddle when said saddle is draped over the outer surface of the roller.

5. The apparatus according to claim 1 wherein the opening is an elongate slot.

6. The apparatus according to claim 1 wherein the opening is curved to match a curvature of the cylindrical surface.

7. An apparatus for measuring the surface venting of the outer surface of a roller comprising:
   a smooth pliable saddle capable of being draped over the outer surface of the roller;
   a pick-up head having an opening positioned at a midpoint of said saddle, the opening facing the outer surface of the roller when said saddle is draped over the outer surface of the roller; and
   a vacuum pump coupled to said pick-up head for sucking air between the outer surface of the roller and said saddle and through the opening when said saddle is draped over the outer surface of the roller.

8. An apparatus for measuring the surface venting of a cylindrical surface comprising:
   a smooth pliable saddle capable of being draped over the cylindrical surface;
   a pick-up head having an opening positioned at a midpoint of said saddle, the opening facing the cylindrical surface when said saddle is draped over the cylindrical surface.

9. The apparatus according to claim 8 wherein said saddle comprises polyethylene terepthalate.

10. The apparatus according to claim 8 further comprising:
    a flow gauge for measuring the air flow through the opening.

11. The apparatus according to claim 8 further comprising:
    weights attached to the saddle when said saddle is draped over the outer surface of the roller.

12. The apparatus according to claim 8 wherein the opening is an elongate slot.

13. The apparatus according to claim 8 wherein the opening is curved to match a curvature of the cylindrical surface.

14. A method of characterizing the surface venting of a cylindrical surface comprising:
    providing a gauge comprising:
       a smooth pliable saddle capable of being draped over the cylindrical surface;
       a pick-up head having an opening positioned at a mid-point of said saddle, the opening facing the cylindrical surface when said saddle is draped over the cylindrical surface;
    applying a vacuum to said pick-up head wherein air is sucked between the cylindrical surface and said saddle through said opening when said saddle is draped over the cylindrical surface;
    calibrating the gauge by measuring the flow through the gauge when the saddle is draped over one or more cylindrical surfaces having known traction;
    establishing a range of air flows for cylindrical surfaces having acceptable traction;
    measuring the air flow through the gauge when the saddle is draped over a cylindrical surface having unknown traction; and
    determining whether the cylindrical surface having unknown traction is within the range of air flows.

* * * * *